Figure 1:
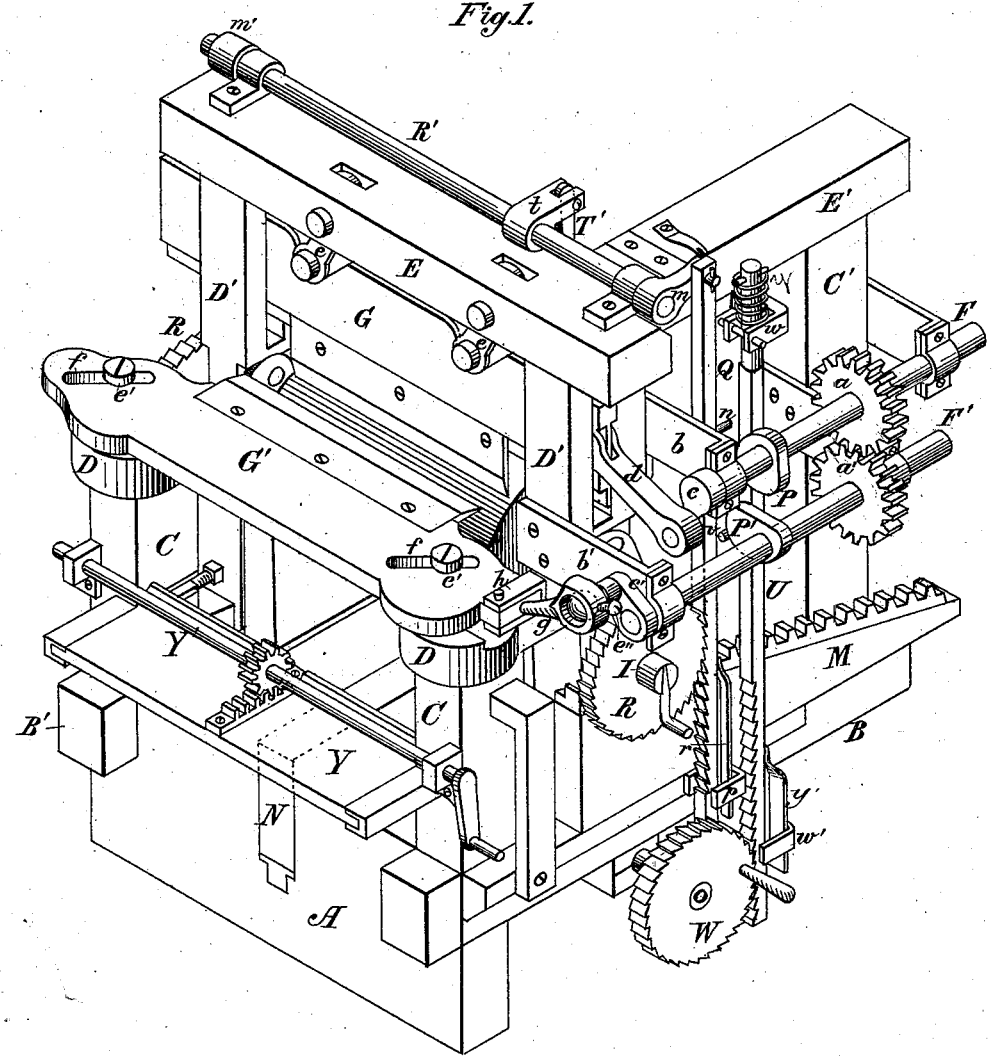

3 Sheets—Sheet 1.

J. B. DOUGHERTY.
Machine for Cutting Hoops from the Log.

No. 203,429.      Patented May 7, 1878.

Attest:
F. H. Schott
Fred E. Tasker.

Inventor:
John B. Dougherty
by J. C. Tasker & Co.
attys

3 Sheets—Sheet 2.

J. B. DOUGHERTY.
Machine for Cutting Hoops from the Log.

No. 203,429. Patented May 7, 1878.

Attest:
F. H. Schott
Fred E. Tasker

Inventor:
John B. Dougherty
by A. J. C. Tasker & Co.
attys

3 Sheets—Sheet 3.

J. B. DOUGHERTY.
Machine for Cutting Hoops from the Log.

No. 203,429. Patented May 7, 1878.

Attest:
F. H. Schott
Fred E. Tasker.

Inventor:
John B. Dougherty
by
J. C. Tasker & Co.
attys

UNITED STATES PATENT OFFICE.

JOHN B. DOUGHERTY, OF ROCHESTER, ASSIGNOR TO BURRELL, IVES & CO. AND D. H. BURRELL, OF LITTLE FALLS, NEW YORK.

IMPROVEMENT IN MACHINES FOR CUTTING HOOPS FROM THE LOG.

Specification forming part of Letters Patent No. 203,429, dated May 7, 1878; application filed March 19, 1878.

*To all whom it may concern:*

Be it known that I, JOHN B. DOUGHERTY, of Rochester, in the county of Monroe and State of New York, have invented certain new and useful Improvements in Machines for Cutting Hoops from the Log; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to improve that class of machines used in cutting hoops for barrels and other analogous purposes, by so constructing them as to render them capable of cutting the hoops directly from the log in such a manner as to allow the grain to be continuous, or nearly so, from end to end of the hoop, and at the same time by severing them radially to cause each hoop to have a bevel which will wholly or partially compensate for the taper of the barrel or other article of coopers' ware to which they are applied.

The invention consists, first, in the means employed in cutting the hoop from the log in such a manner that its sides shall form radii from the log's center, thus causing the hoop to be thinner at one edge than the other; secondly, in the method of cutting hoops from the log by means of reciprocating and alternately advancing and retreating cutting-knives; thirdly, in the means employed for imparting and controlling the movement of the cutting-knives; fourthly, in the construction and method of applying the feed-roller and other devices employed in giving a rotary motion to the log; fifthly, in the means employed for gradually raising the log to keep its periphery in position for the action of the knives as its diameter decreases from the continuous removal of hoops; sixthly, in the means employed for the purpose of raising the log to the centers when placed in the machine, as well as supporting it under the thrust of the vertically-reciprocating knives, thereby relieving the centers from a great strain; seventhly, in arranging the log-centers in swinging slotted ways, so that they may be both vertically and horizontally adjustable, to enable the operator to change the angle at which the log is presented to the knives; and, further, in various details of construction, all of which will be hereinafter fully described, and then specifically pointed out in the claims.

Figure 2:
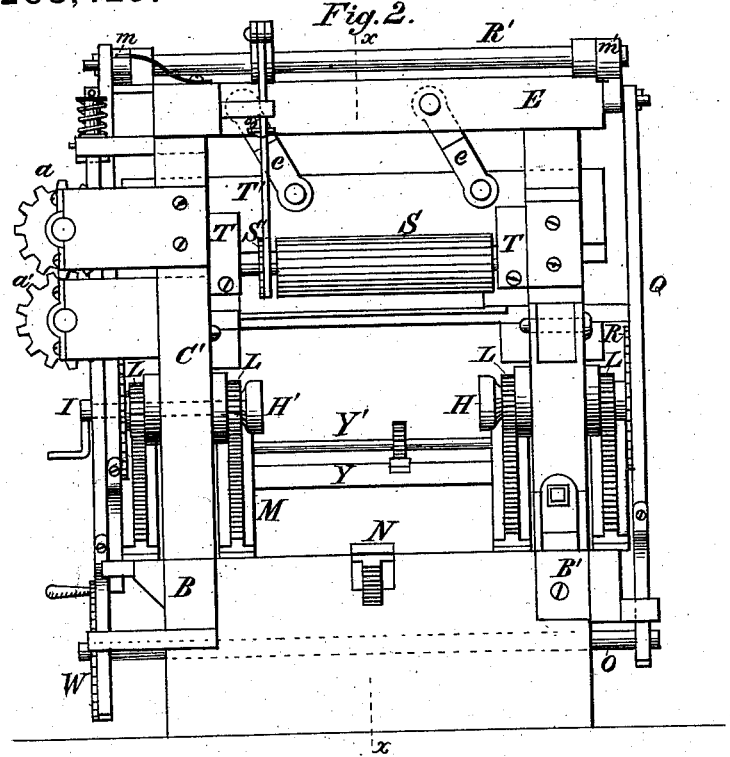
Figure 3:
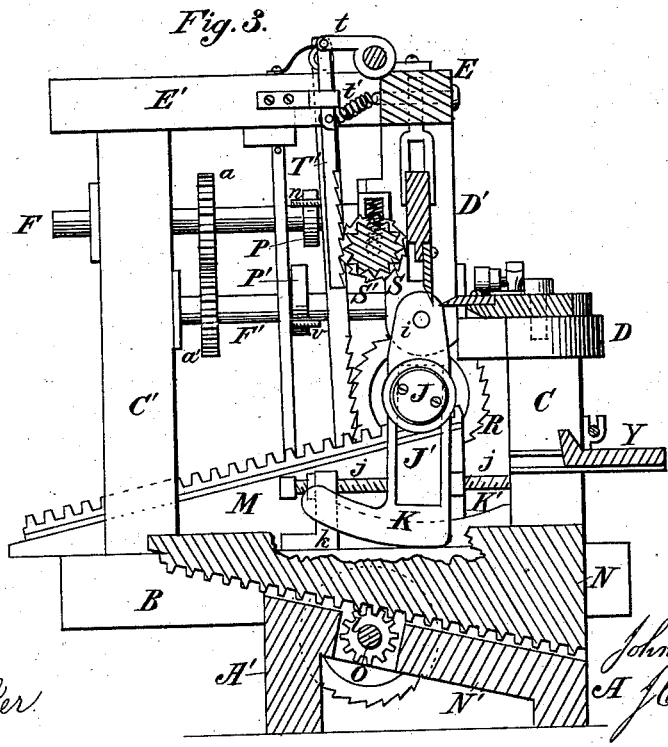
Figure 4:
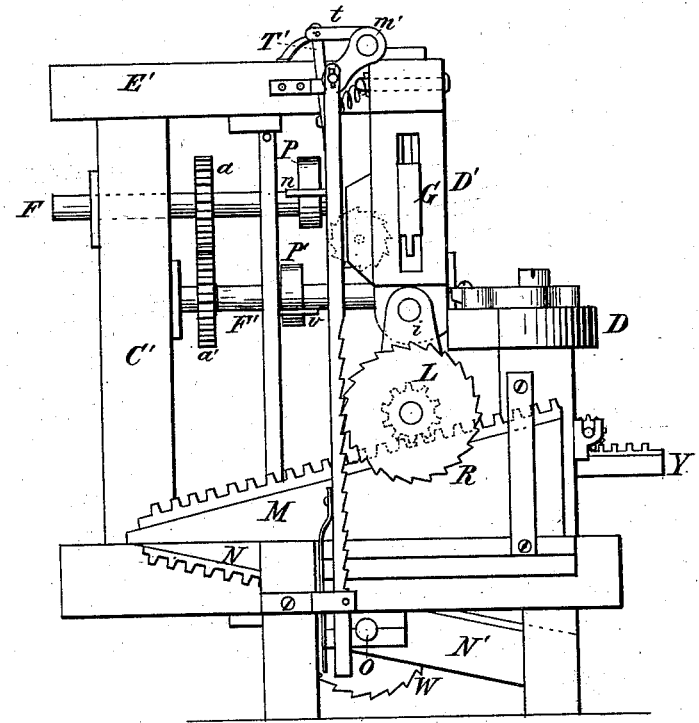
Figure 5:
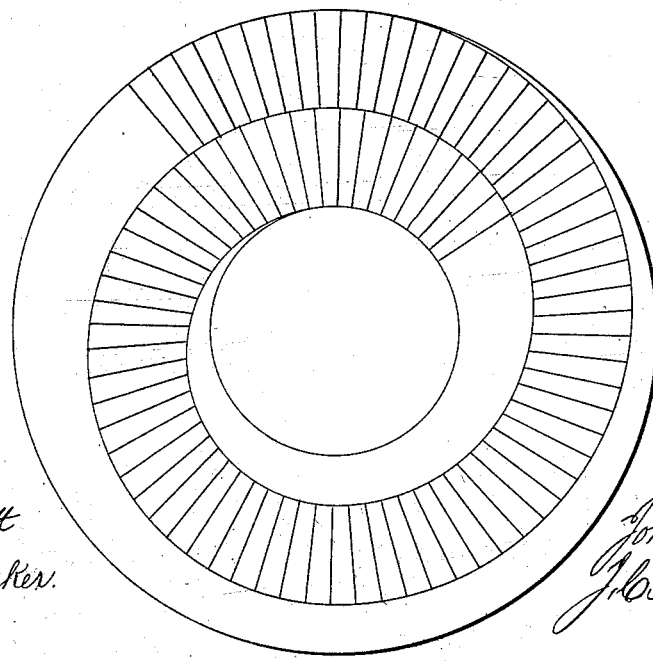

In the accompanying drawings, Figure 1 is a perspective view of the machine, showing the general arrangement of the driving mechanism and its connection with the cutting-knives and feeding devices. Fig. 2 is a rear elevation, showing the feeding-roll, its operating mechanism, the log-centers, the log-support, and the devices used for turning its periphery to a true circle when first placed in the machine. Fig. 3 is a vertical section on the line $x\ x$ of Fig. 2, showing the adjustable center-supports and the means employed to give motion to the central log-support. Fig. 4 is an end elevation, showing the opposite end of the machine from that shown in Fig. 1. Fig. 5 is a diagram, exhibiting the succession of cuts by which the log is formed into hoops.

The machine, as shown in the drawings, is provided with a supporting frame-work, which rests upon two longitudinal sills, A and A', upon which are placed the transverse sills B and B'. From these transverse sills rise the short front posts C and the rear post C'. Resting upon the top of the posts C are the horizontal knife-supports D, the inner end of which is attached to the lower end of the pendent slotted guides D', the upper ends of which are secured to the cap E. This cap is supported and retained in position by the guides D' and cap-piece E', one end of which rests on the post C', the other being secured to the cap E.

Motion is communicated to the operating parts of the machine through either of the two crank-shafts F or F'. As these shafts are connected by the spur-gears $a$ and $a'$, of equal diameter, placed upon them, thus causing them to revolve synchronically, it makes no difference in the operation of the machine which of them is the prime mover. The ends of these shafts F and F' nearest the cranks $c$ and $c'$ are supported in journal-boxes $b\ b'$ attached to one of the guides D', the opposite ends of the shafts revolving in boxes secured to the post C' or to any other suitable support.

Attached to the crank c upon the shaft F, by means of a connecting-rod, d, is the vertically-arranged knife-carrier G, reciprocating in the pendent guides D', and supported by means of the parallel-motion bars e, pivoted to the carrier and to the cap E, which are so arranged that when the crank-pin is at the point of throw farthest from the carrier they shall assume a vertical position, causing the carrier and its attached knife to reach their lowest point; but as the crank continues to revolve the bars e will be forced out of their vertical position into an inclined position, as shown in Fig. 1 of the drawing, thus raising the carrier and knife; but as the crank-pin returns to the point farthest from the machine the carrier and knife will be drawn downward in an oblique direction, giving to the knife a drawing shear-cut, which has been found by practice to be the best for severing wood with the least expenditure of power, as well as giving smoothness and freedom from checks to the cut surfaces.

The horizontally-moving knife-carrier G' rests and reciprocates upon the supports D, being guided in its movements by the pins e' passing through the diagonal slots f in the carrier, or by other equivalent devices which shall impart a similar diagonal movement to the carrier and knife.

Motion is given to the knife-carrier G' from the crank c' on the shaft F' by means of the connecting-rod g, one end of which is bored out to fit the spherical crank-pin of the crank c', being prevented from slipping off by the set-screw e'', which passes through the end of the connecting-rod and enters a groove which encircles the pin, or by any other suitable arrangement of devices which shall give the connecting-rod free movement on the pin. The opposite end of the connecting-rod g is spherical, and moves in the socket h attached to the knife-carrier G'. By this method of connecting the crank with the knife-carrier, although the crank revolves in a vertical plane, free horizontal and longitudinal movement is given to the knife and carrier G', enabling it to operate upon the material with a shear-cut, substantially in the same manner as does the vertically-moving knife and carrier heretofore described.

It will be observed that the movements of the two knife-carriers are so timed that both are moving toward each other at the same instant, thus causing the vertically-moving knife to cut toward the center of the log, thus forming a hoop, while the other knife cuts into the log horizontally, removing a hoop that was formed by the preceding cut of the vertically-moving knife; or the operation of the knives may be reversed, and the horizontal cut made first, leaving the removal of the hoop to the vertically-moving knife.

The mechanism for holding the log consists of the two revolving centers or chucks H and H', the first of which has no longitudinal movement; but the last, H', is provided with a screw, I, by means of which it may be moved forward upon its bearings, so as to make up for differences in the length of the logs operated upon. These centers are journaled in boxes J, which are vertically-adjustable in the slots J' of the swinging center-supports K. These supports are connected at their upper ends to the lower end of the pendent guides D' by pivots i, and rest at the bottom on curved shoes K', being adjusted thereon and firmly held in any desired position by the adjusting-screws j and j', the first of which passes through lugs k secured to the sills, and bear against one side of the support K, while the screws j' bear against their opposite sides, screwing into the posts C. By this arrangement the position of the log with relation to the cutting-knives is changed horizontally. In order to keep the proper vertical adjustment of the centers, they are each provided with two spur-gears, L L, which rest in toothed racks upon the upper sides of the inclines M, that reciprocate in guiding-ways attached to the sills B and B'. The object of these inclines is to raise the centers, and with them the log as it becomes reduced in size, so that as the cut goes spirally around the log there shall be no diminution in the width of the hoop cut from first to last.

In order to give the log a firm central bearing to resist the action of the vertical knife while being cut into hoops, the wedge N, provided with a rack on its under side, is placed in suitable ways N' and operated by means of a pinion, l, upon the shaft O. The upper side of the wedge is level, and therefore presents an even surface for the support of the log, with which it moves, as the diameter of the latter is reduced. It also serves a useful purpose in sustaining the log while it is being secured between the centers.

In order to impart the proper rotary motion to the log and to advance the inclines M at a proper speed, a cam, P, is secured upon the shaft F. As the shaft rotates this cam comes in contact with the pin n of the lifting-bar Q. The upper end of this bar is attached to an arm, m, of the rock-shaft R', which rests in suitable bearings attached to the cap E. Another arm, m', at the opposite end of the rock-shaft, carries the lifting-bar Q'. The lower ends of these lifting-bars are serrated, and reciprocate in guides p, attached to the side sills. A spring, r, placed behind the lifting-bars, serves to keep their toothed or serrated ends in contact with the ratchet-wheels R, secured to the outer ends of the centers H and H'. By this means at each upward movement of the knife-bar G the cam P, acting upon the lifting-bars, will rotate the centers, and thus assist in the forward movement of the log, as well as moving the inclines M the necessary distance required to make up the loss in diameter of the log as each hoop is cut from it. But to insure the regular feeding forward of the log a certain specified distance at each reciprocation of the cutting-knives a fluted feeding-roller, S, journaled in vertically-moving spring-bearings inclosed in cases T attached to the back of the pendent guides D', is placed behind the knife, and kept in close contact with the surface of the log by means of its own weight and the pressure of the springs in the cases T upon its journals. To impart an equable feeding-motion to this roll, and through it to the surface of the log, an arm, t, is attached to the rock-shaft R', carrying at its outer end the rod T', provided with serrations at its lower end, which act upon the teeth of the ratchet-wheel S', attached to one of the journals of the feed-roll. To retain the rod T' in contact with the ratchet upon the feed-roll, a spring, t', is attached to it at one end, the other being secured to the cap E. By this means a uniform feeding-movement is given to the periphery of the log, it being moved forward the thickness of a hoop at each reciprocation of the knives. In order to give a proper advancing movement to the supporting-wedge N, a cam, P', is secured upon the crank-shaft F', which, as the shaft rotates, strikes the pin v in the bar U. This gives to the bar, which is supported in the guides w and w', a vertically-reciprocating movement sufficient to cause the teeth formed on its lower end to act upon the teeth of the ratchet-wheel W, and through it rotate the shaft O, by which the wedge is moved forward to support the log. Springs y and y' are placed one at the upper end of the bar, to raise it after it has been depressed by the cam, and the other, y', within the guide w', to keep the toothed portion of the bar in contact with the ratchet-wheel W. When it is desired to operate the wedge N by hand for the purpose of supporting logs while being centered, the bar U is pressed back so as to disengage it from the teeth of the ratchet, when the shaft O may be rotated by means of the crank-handle inserted in the wheel W. For the purpose of truing up a log after it has been secured between the centers, it is rotated by any suitable means, and a knife attached to the front edge of the slide Y, which moves in horizontal guides secured to the posts C.

A regular forward movement is given to this slide and knife by means of the shaft Y', revolving in bearings attached to the posts C above the guides, and carrying a pinion which acts upon a rack secured to the slide, the whole being so constructed that it can be readily removed after the log has been turned true, and its services no longer required until a fresh log is to be operated upon, when it may be quickly replaced.

From an inspection of Fig. 5 of the drawings, it will be seen that the log is cut away in a scroll form, in the same manner as when veneers are cut from a rotating log; but in this case the thickness of the veneers is represented by the width of a hoop. It is believed that by the use of this machine a great saving of material is effected, as a much larger proportion of the log is formed into serviceable hoops than can be obtained from it by any other machine with which I am acquainted. Their quality is also greatly improved, as the grain of the wood is continuous from end to end of the hoop.

Having thus described my invention, I claim as new, and desire to secure by Letters Patent, the following:

1. The horizontally-moving knife-carrier and knife and its supports and guides, in combination with the universal-jointed connecting and crank shaft F', for the purpose of cutting the narrow edge of the hoop from the log, as set forth.

2. The vertically-moving knife, its carrier, the connecting-rod d, and shaft F, provided with spur-gear a, in combination with the shaft F', carrying spur-gear a', connecting-rod g, and horizontally-moving carrier and knife, for the purpose of severing one side and the edge of a hoop from the log, as described.

3. The spring-pressed and fluted feed-roller S, resting and acting upon the periphery of the log, in combination with its operative mechanism, consisting of the cam P upon the shaft F, rod Q, rock-shaft R', and ratchet-bar T', acting upon the ratchet-wheel S', substantially as specified.

4. The crank-shaft F, cam P, lifting-bar Q, and rock-shaft R', in combination with the toothed bar T' and ratchet S', for the purpose of rotating the feed-roller, as described.

5. The toothed inclines M, in combination with the vertically-adjustable center-chucks, for the purpose of raising the log as it rotates, substantially as described.

6. The central wedge N, in combination with the pinion l and shaft O, for the purpose of affording a solid central support to the log, as set forth.

7. The slotted swinging supports K, in combination with the vertically-adjustable center-chucks H and H', as set forth.

8. The swinging support K, in combination with the arc-shaped shoes K' and adjusting-screws j and j', as and for the purpose specified.

9. A machine for cutting hoops embodying the following instrumentalities, namely: a vertically-reciprocating knife, a horizontally-moving knife, a feed-roller operating upon the periphery of the log to be cut, and a central log-support, all constructed and operating substantially as shown and described.

10. In a hoop-cutting machine, log-holding centers or chucks sustained in swinging supports, in combination with the mechanism employed for adjusting and rotating the centers as the log becomes smaller, all as and for the purpose specified.

In testimony that I claim the foregoing as my own I hereunto affix my signature in presence of two witnesses.

JOHN B. DOUGHERTY.

Witnesses:
  HORACE G. PIERCE,
  THOMAS D. WILKIN.